(12) United States Patent
Jain

(10) Patent No.: US 6,585,312 B2
(45) Date of Patent: Jul. 1, 2003

(54) TRACTOR TRAILER GAP TREATMENT

(75) Inventor: Sunil K. Jain, Fort Wayne, IN (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 10/212,941

(22) Filed: Aug. 6, 2002

(65) Prior Publication Data

US 2003/0030300 A1 Feb. 13, 2003

Related U.S. Application Data

(60) Provisional application No. 60/311,195, filed on Aug. 9, 2001.

(51) Int. Cl.$^7$ .............................................. B62D 35/00
(52) U.S. Cl. ................................ 296/180.1; 296/180.2; 296/180.4
(58) Field of Search .......................... 296/180.1, 180.2, 296/180.4; 105/1.1, 1.2, 1.3

(56) References Cited

U.S. PATENT DOCUMENTS

| | | | | |
|---|---|---|---|---|
| 3,348,873 A | * | 10/1967 | Saunders | ................. 296/180.2 |
| 4,210,354 A | * | 7/1980 | Canning | |
| 4,257,643 A | * | 3/1981 | Choulet | |
| 4,775,179 A | * | 10/1988 | Riggs | ....................... 296/180.2 |
| 4,883,307 A | * | 11/1989 | Hacker et al. | ........... 296/180.2 |
| 5,658,038 A | * | 8/1997 | Griffin | ..................... 296/180.2 |
| 6,267,434 B1 | * | 7/2001 | Casillas | ................... 296/180.1 |

FOREIGN PATENT DOCUMENTS

| | | | | |
|---|---|---|---|---|
| GB | 1539452 | * | 1/1979 | ............... 296/180.4 |
| GB | 0821277 | * | 4/1981 | ............... 296/180.4 |

\* cited by examiner

*Primary Examiner*—Joseph D. Pape
(74) *Attorney, Agent, or Firm*—Jeffrey P. Calfa; Neil T. Powell; Dennis Kelly Sullivan

(57) ABSTRACT

A tractor-trailer system uses aerodynamic principles to use crosswind to its advantage. The system has a curvilinear duct by having a attaching a convex body on the trailer front and a concave body on the back of the cab. When a cross wind enters the gap, it creates a negative pressure (compare to ambient) on the convex surface (trailer front) and a positive pressure on concave surface (back of the cab). Both of these pressures will help reduce the drag. Further having the crosswind flow smoothly can lead to less turbulence intensity in the gap, which can help in improving handling qualities of the system. There is a similar situation both for drag as well as handling qualities can be given for the air traveling in vertical direction (even at zero cross wind).

7 Claims, 3 Drawing Sheets

TOP VIEW OF TRACTOR TRAILER SYSTEM (BEFORE TREATMENT)

SIDE VIEW OF TRACTOR TRAILER SYSTEM (BEFORE TREATMENT)

TRACTOR TRAILER GAP TREATMENT

This is a non-provisional patent application claiming the priority of provisional patent application Serial No. 60/311,195, filed Aug. 9, 2001.

BACKGROUND

This invention relates to the aerodynamics of a mobile vehicle, specifically the gap between a powered vehicle and pulled trailer. Examples would include a tractor-trailer heavy-duty truck and a towed mobile home. The gap between a tractor and trailer plays an important role in the overall performance the system during a cross wind. It affects drag as well as the handling quality of the vehicle and trailer combination.

PRIOR ART

In the prior art there have been attempts to close up the gap between the rear of the tractor and the front of the trailer. None of these was too practicable. An example is shown in FIGS. 1 and 2. The cab 201 of the tractor-trailer has side extenders 204 which extend to cover the gap 203 between the cab 201 and the trailer 202. Other prior art concepts included changing the shape of the front of the trailer to reduce overall aerodynamic drag. U.S. Pat. Nos. 4,021,069 and 4,702,509 are examples of this approach.

What is needed and does not exist in the prior art is a tractor-trailer system that uses crosswind to its advantage to form a low pressure zone relative ambient in the region between the tractor and the trailer in order to reduce aerodynamic drag.

SUMMARY

An object of the invention is to provide a tractor-trailer system that uses crosswind to its advantage to create preferred pressure field in the region between the tractor and the trailer in order to reduce aerodynamic drag.

The tractor-trailer system of this invention uses aerodynamic principles to use crosswind to its advantage. The system has a curvilinear duct by attaching a convex body on the trailer front and a concave body on the back of the cab. When a cross wind enters the gap, it creates a negative pressure (compare to ambient) on the convex surface (trailer front) and a positive pressure on concave surface (back of the cab). Both of these pressures will help reduce the drag. Further having the crosswind flow smoothly can lead to less turbulence intensity in the gap, which can help in improving handling qualities of the system. There is a similar situation both for drag as well as handling qualities can be given for the air traveling in vertical direction (even at zero cross wind).

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DESCRIPTION OF THE INVENTION

Figure 1:
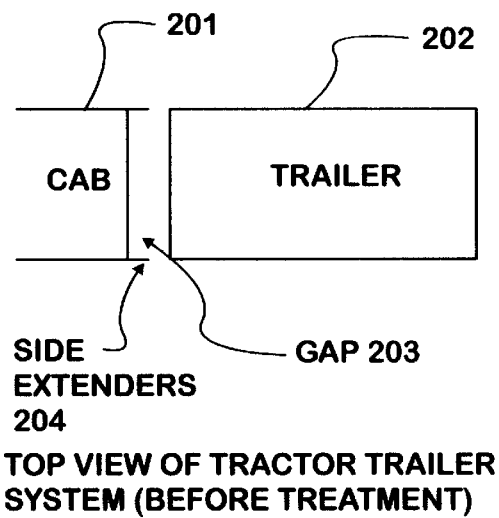
FIG. 1 is a top down view of a prior art tractor trailer system.
Figure 2:
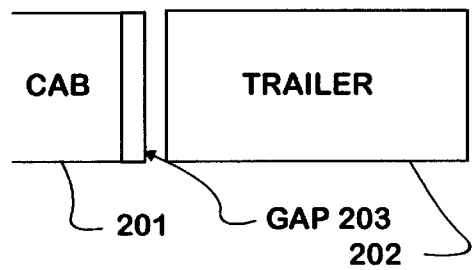
FIG. 2 is side view of the prior art shown in FIG. 1.
Figure 3:
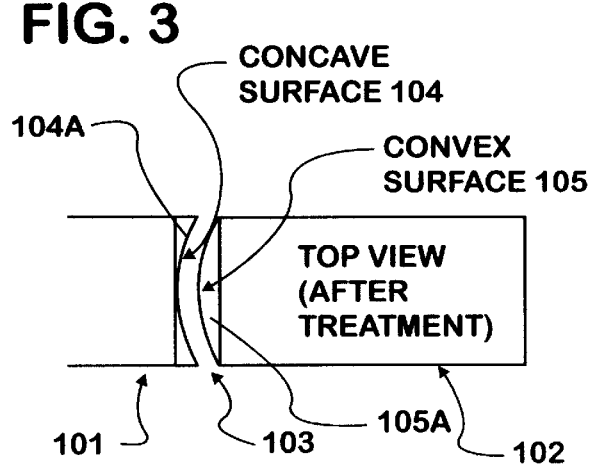
FIG. 3 is a top down view of a tractor trailer system made in accordance with this invention.
Figure 4:
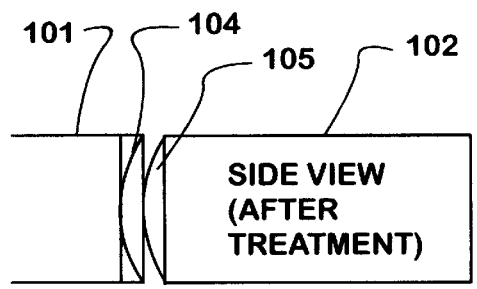
FIG. 4 is a side view of the tractor trailer system of FIG. 3.
Figure 5:
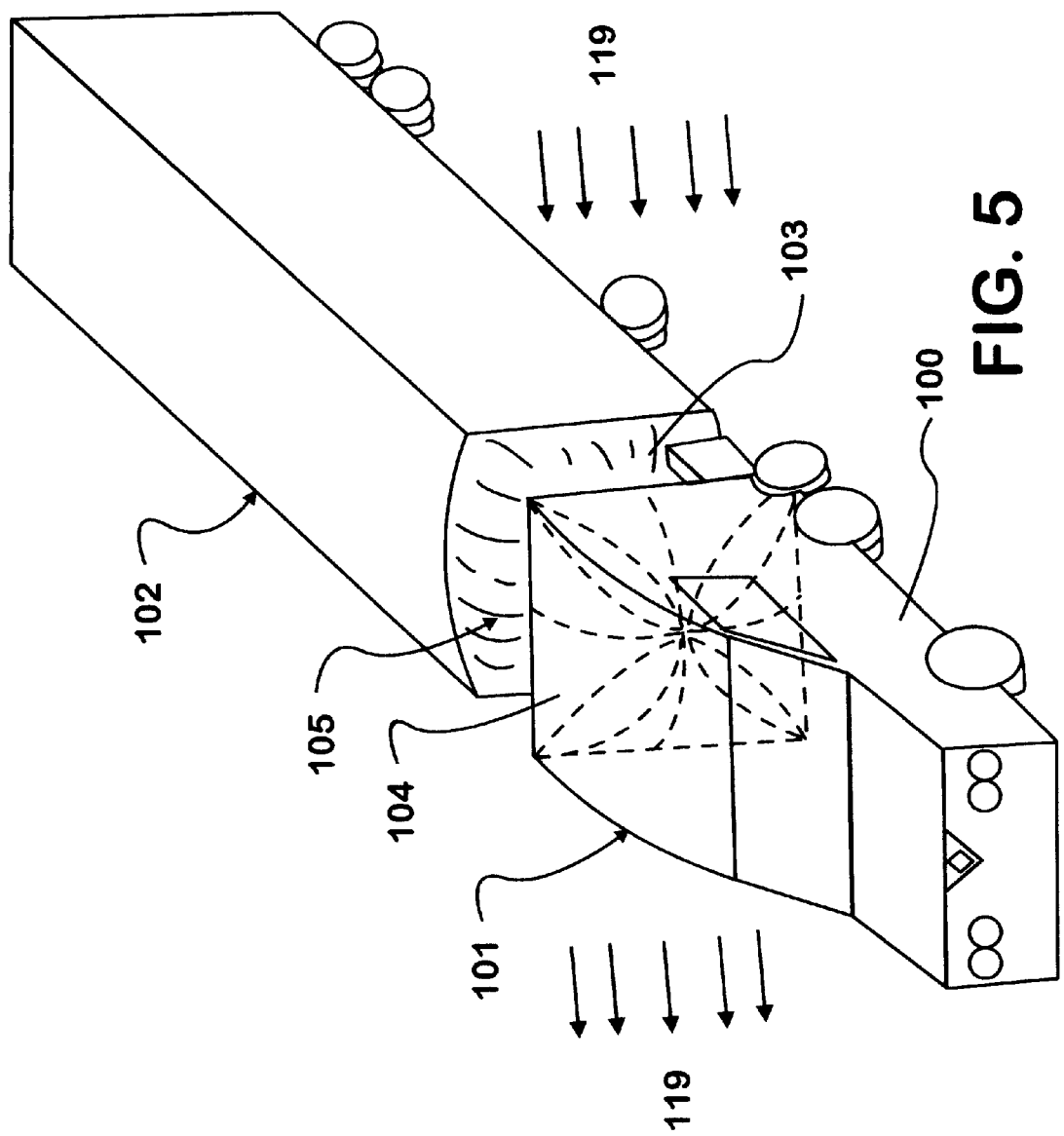
FIG. 5 is a perspective view of one embodiment of a tractor-trailer system made in accordance with this invention.

The cab 101 of the tractor or towing vehicle 100 is shown joined to a trailer 102 or other towed vehicle in FIGS. 3 to 5. The towing vehicle 100 may be a heavy-duty truck or any vehicle capable of towing a trailer such as a pickup truck, a mobile home or other recreational vehicle. The trailer 102 may be one of many kinds of towed vehicles such as a camper. The language of this document refers to the towing vehicle 100 as a tractor but it is understood that it may not strictly be limited to being a highway tractor as the towed vehicle or trailer 102 may not limited to a commercial load carrying trailer. The tractor-trailer system of this invention uses aerodynamic principles to use crosswind to its advantage. The system has a curvilinear duct 103 by having a attaching a convex surface 105 on the trailer 102 front and a concave surface 104 on the back of the cab 101. When a cross wind 119 enters the gap 103, it creates a negative pressure (compare to ambient) on the convex surface 105 (trailer front) and a positive pressure on concave surface 104 (back of the cab). Both of these pressures will help reduce the overall drag on the tractor-trailer combination. Further having the crosswind 119 flow smoothly can lead to less turbulence intensity in the gap 103, which can help in improving handling qualities of the system. Because of the smoother nature of the flow in the gap 103 (compare to flow without the treatment), the handling quality of the system in the presence of cross wind improves. There is a similar situation both for drag as well as handling qualities can be given for the air traveling in vertical direction (even at zero cross wind). In one embodiment, the concave surface 104 is a mirror image of the convex surface 105.

The convex surface 105 may be an integral part of the towed vehicle or trailer or an added on convex body 105A which includes the convex surface 105. Similarly, the concave surface 104 may be an integral part of the towing vehicle or tractor or an added on concave body 104A which includes the concave surface 104. The convex body 105A and the concave body 104A may be marketed separately as an aerodynamic conversion kit.

Figure 6:
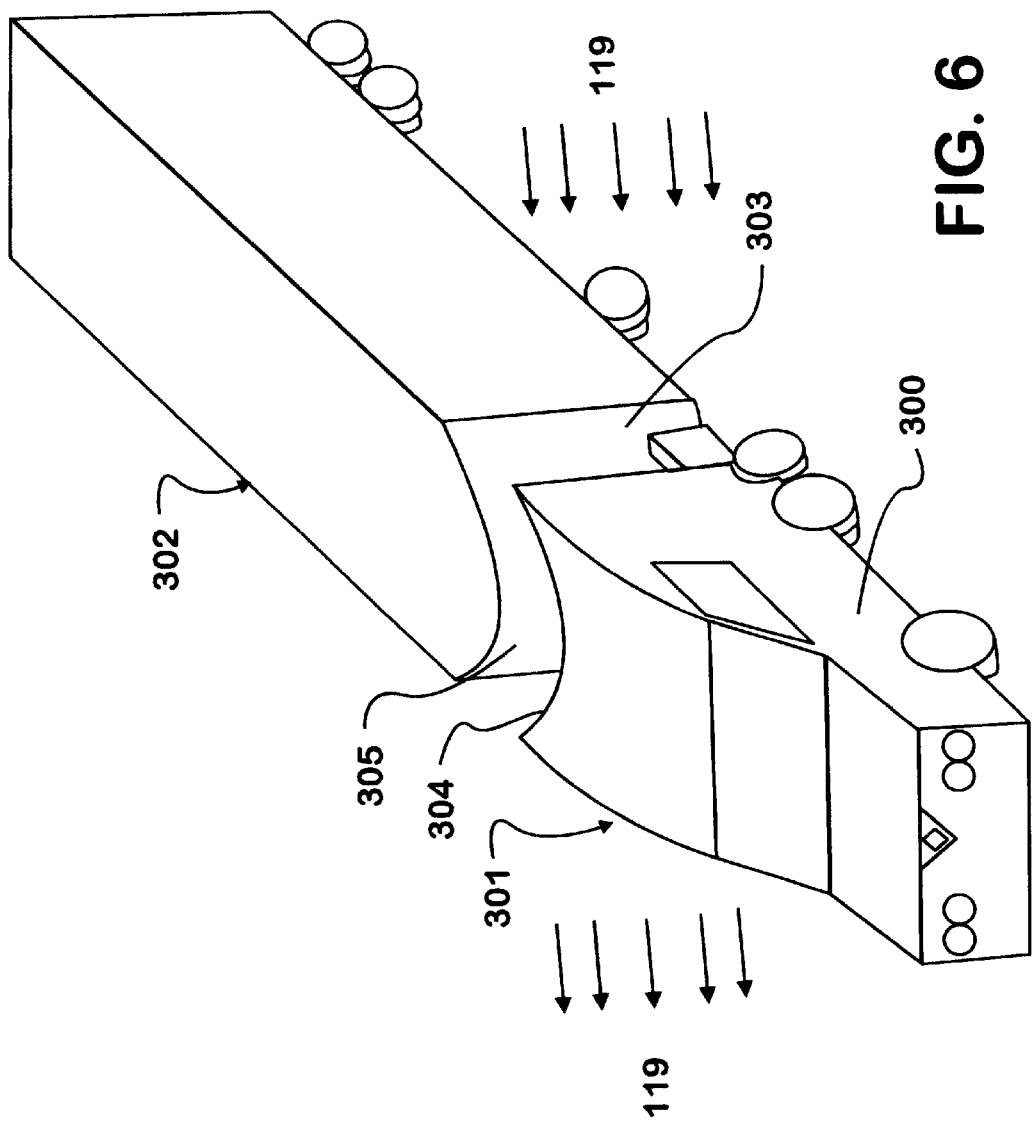
FIG. 6 is a perspective view of another embodiment of a tractor-trailer system made in accordance with this invention.

An alternative embodiment of this invention is shown in FIG. 6 where the convexity 305 on the trailer 302 and the concavity 304 on the cab 301 of a vehicle 300 are both only in the horizontal plane. For this embodiment, only crosswinds 119 and not vertical air movement would be impacted.

As described above, tractor-trailer system provides a number of advantages, some of which have been described above and others of which are inherent in the invention. Also modifications may be proposed to the tractor-trailer system without departing from the teachings herein.

I claim:

1. A towing vehicle and towed vehicle combination, comprising:
    a towing vehicle joinable to a towed vehicle;
    a curvilinear duct between said towing vehicle and said towed vehicle;
    said curvilinear duct formed between a concave surface on a rearward side of said towing vehicle and a convex surface on a frontward side of said towed vehicle; and said curvilinear duct creating a negative pressure on said convex surface and a positive pressure on said concave surface when a crosswind passes through said duct during towing vehicle and towed vehicle forward movement.

2. The combination of claim 1, wherein:

said concave surface on said towing vehicle is a formed on a separate concave body piece joined to a rearward portion of a cab of said towing vehicle; and said convex surface on said towed vehicle is formed on a separate convex body piece joined to a frontward side of said towed vehicle.

3. The combination of claim 1, wherein:

said concave surface of said towing vehicle is a mirror image of said convex surface of said towed vehicle.

4. A towing vehicle and towed vehicle combination, comprising:

a towing vehicle joinable to a towed vehicle;

a curvilinear duct between said towing vehicle and said towed vehicle;

said curvilinear duct formed between a concave surface in a horizontal plane on a rearward side of said towing vehicle and a convex surface in a horizontal plane on a frontward side of said towed vehicle; and said curvilinear duct creating a negative pressure on said convex surface and a positive pressure on said concave surface when a crosswind passes through said duct during towing vehicle and towed vehicle forward movement.

5. The combination of claim 4, wherein:

said concave surface on said towing vehicle is a formed on a separate concave body piece joined to a rearward portion of a cab of said towing vehicle; and said convex surface on said towed vehicle is formed on a separate convex body piece joined to a frontward side of said towed vehicle.

6. The combination of claim 4, wherein:

said concave surface of said towing vehicle is a mirror image of said convex surface of said towed vehicle.

7. An aerodynamic conversion kit for a mobile towing vehicle and towed vehicle, the towing vehicle joinable to the towed vehicle, comprising:

a concave surface formed on a concave body piece engageable to a rearward portion of a cab of the towing vehicle;

said convex surface formed on a convex body piece engageable to a frontward side of the towed vehicle;

a curvilinear duct formed between said concave and convex bodies when said bodies are engaged to the towing vehicle and the towed vehicle; and said curvilinear duct creating a negative pressure on said convex surface and a positive pressure on said concave surface when a crosswind passes through said duct during towing vehicle and towed vehicle forward movement.

* * * * *